Patented Mar. 17, 1925.

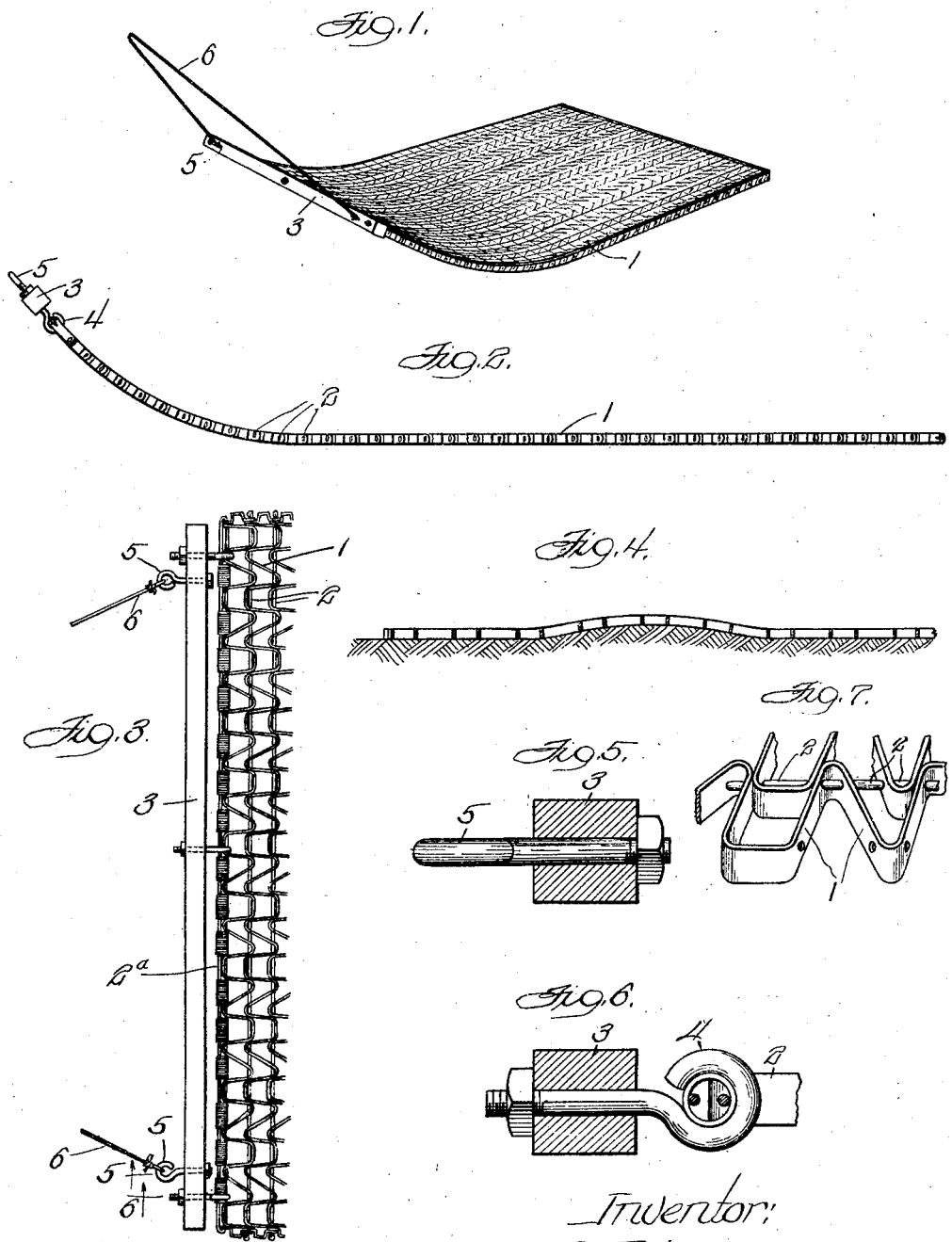

1,530,329

UNITED STATES PATENT OFFICE.

EDWARD G. ROBERTS, OF CHICAGO, ILLINOIS, ASSIGNOR TO J. OLIVER JOHNSON, INC., OF CHICAGO, ILLINOIS, A CORPORATION OF ILLINOIS.

DRAG FOR LAWN DRESSINGS.

Application filed March 24, 1924. Serial No. 701,360.

*To all whom it may concern:*

Be it known that I, EDWARD G. ROBERTS, citizen of the United States, residing at Chicago, in the county of Cook and State of Illinois, have invented certain new and useful Improvements in a Drag for Lawn Dressings; and I do hereby declare the following to be a full, clear, and exact description of the invention, such as will enable others skilled in the art to which it appertains to make and use the same.

My invention relates to drags for leveling soil and working dressing into the same, and more particularly to a drag suitable for use in the truing of putting greens and in working the socalled top dressing into the same.

In shaping the greens on golf grounds to the desired contour of the top, the ordinary straight-edged drags have not proven adequate, owing to the extent to which a somewhat curved or rolling surface is generally desirable for many portions of the green. On the other hand, the curvature which is thus permissible is relatively small, so that a generally flexible drag will not answer the desired purpose of truing the green to such a surface as will avoid undesirable bumps while still affording the gradual and often irregular curving which increases the difficulty of the putting and elicits high skill on the part of the players.

Moreover, the problems which arise in the original surfacing of the soil for the freshly planted grass also arise later on when the growth of this grass needs to be stimulated and when the socalled top dressing needs to be worked down around the crown of the grass. This cannot readily be done by any solid drag or by one which is either inflexible or unduly flexible. A further difficulty encountered in the proper care of the greens arises through the frequent presence of worms and the worm mounds produced by them, which mounds constitute elevations that need to be cut down to the general surface contour of the adjacent portion of the green. This also cannot be done with the drags heretofore employed, as they will not trim off the projecting mound portions without spoiling the desired general surface curvature of that part of the green.

My present invention aims to provide a drag free from these objections of the older types of drags and one particularly designed for accomplishing the above mentioned threefold requirements for the proper care of greens both during the seeding period and later on throughout the golfing season. More particularly, my invention provides a drag having relatively large flexibilty longitudinally of the drag while having a much more limited flexibility in a direction transverse of the drag.

It also provides means associated with the forward end of the drag, and adapted to be raised off the ground during the normal use of the drag, for limiting the flexing of the drag in transverse section still more near its forward end, thereby preventing any undue transverse flexing of the drag in its forward portion while permitting a relatively greater transverse flexing in the more rearward parts. Furthermore, my invention provides a drag construction including a large number of pocket formations in which the portions of the soil or dressing may be caught temporarily and distributed during the movement of the drag so as to be worked into any holes or crevices. It also provides a drag for these general purposes in which the parts affording such pockets have relatively sharp edges so as to adapt them to cutting off projecting mound portions or the like. Still further and also more detailed objects will appear from the following specification and from the accompanying drawings, in which—

Fig. 1 is a perspective view of a drag embodying my invention, showing this as it appears when in use with its forward end lifted off the ground or the green by the pulling loop.

Fig. 2 is an enlarged central, vertical and longitudinal section through the same drag.

Fig. 3 is a fragmentary plan view of the forward portion of the multi-pocketed main portion of the drag, drawn on a still larger scale.

Fig. 4 is a transverse vertical section through a rearward portion of this main portion, showing how this adjusts itself to curvatures of relatively large radius.

Figs. 5 and 6 are enlarged sections taken respectively along the lines 5—5 and 6—6 of Fig. 3.

Fig. 7 is a perspective view of a fragment of the main portion of the drag, drawn on a still larger scale.

In accomplishing the purposes of my invention according to the illustrated embodiment, I provide a drag having as its main portion a multi-pocketed steel mat composed of pivotally connected sections which are disposed successively behind each other, each of these sections being stiffened by a pair of rods against undue flexing transversely of the said mat portion. Then I connect the forward end of the mat to a still more rigid stiffening bar to which the pulling rope is attached and which entirely prevents a transverse flexing of the drag mat at its extreme forward end.

In the illustrated embodiment, each of the said transverse sections of the mat consists of a flat strip 1 of steel corrugated transversely by being bent flatwise upon itself to afford a large number of substantially U-shaped formations which successively open forwardly and rearwardly of the strip, the strip having its flat face portions vertical so that it bears edgewise on the ground. The bends thus formed in the consecutive strips nest somewhat into each other and these bend portions are provided with perforations for receiving stiffening rods 2, each of which rods extends through a large number of the said bent formations in two consecutive strips. With the parts thus arranged, each of the stiffening rods 2 forms a pivotal connection between the two transversely corrugated strips which are connected by it, the location of the holes in the strip through which each rod passes being such as to permit the adjacent portions of two consecutive strips to rock with respect to each other about the rod which thus connects them. Owing to this permitted rocking movement between the adjacent sections, the mat or main portion of my drag is readily flexible longitudinally thereof, so as to permit the forward end of the drag to pass over considerable elevations and so as to permit the drag in general to adjust itself to the steeply rolling contour of edge portions of greens.

However, the flexing thus permitted is only considerable in a direction longitudinally of the mat or drag, whereas a flexing transversely of the drag is limited by the flexibility of the connecting pivot rods 2. Each of these rods is desirably made of steel so as to be resilient, and by selecting a suitable size of such rods in proportion to their length, I can readily limit the flexing of the drag transversely thereof. Consequently, the more rearward portions of my drag may be flexed after the manner shown for example in Fig. 4 in adjusting themselves to the finished contour of any particular portion of the greens, but will automatically straighten when reaching more level portions.

However, such an extent of permissible flexing is undesirable in practice at the forward end of the drag, as it would interfere with the proper smoothing and the effective working of soil dressing or the like into the greens. I therefore supply increased stiffness to the forward end of the drag, and for this purpose I preferably provide a stiffening bar which also affords the connection from the main or mat portion of the drag to the loop or rope by means of which the drag is drawn over the green. Thus, the drawings show a stiffening bar 3 of wood connected to the forwardmost stiffening rod $2^A$ of the main portion of the mat by means of three eye-bolts 4. This stiffening bar 3 also carries another pair of eye-bolts 5 to which the ends of the pulling rope 6 are connected.

With this arrangement, the eye-bolts 4 afford a pivotal connection to the forward end of the mat or main portion of the drag, thereby expediting the ease with which this forward portion can be raised off the ground when the drag is in use after the manner shown in Fig. 1. When thus drawn, it will be obvious that the upwardly curved forward end of the drag will readily ride over initial obstructions, such as a pile of the dressing which is to be worked into the soil, thereby permitting this dressing to enter the pocket formations between the U-shaped parts of the successive mat strips 2, so that the soil or dressing thus stored temporarily in these openings of the drag can be distributed and worked into the soil. By disposing the strips 1 edgewise, I secure lower scraping or drag edges upon them which will cut off an undue worm mound projection while readily riding over the grass on the green and while working the soil or dressing down around the grass. Consequently, the drag of my invention is highly efficient for all of the purposes above named.

So also, by having part of the pocket-forming walls of each section disposed obliquely at an acute angle to the direction in which the drag is pulled when in use, I cause these walls to move the entrapped soil or dressing sideways, thereby enabling my appliance to be worked into the soil and around the blades of grass much more effectively than could be done by any drag employing surfaces which all extend longitudinally and transversely of the drag. Furthermore, by having the main portion of my drag flexible in one direction I can permit it to be rolled up from its rear end for compact storage or shipping.

However, while I have heretofore shown and described my invention in a highly desirable embodiment and have pictured it in a construction including a desirable shaping of the drag strips, I do not wish to be limited to these or other details of the construction and arrangement thus disclosed. Obviously, many modifications might be made without departing either from the spirit of my invention or from the appended claims.

I claim as my invention:—

1. A drag mat comprising a plurality of sections extending transversely of the mat and consecutively hinged to one another, each section having resilient stiffening means normally holding its bottom in a single plane while permitting a limited flexing of the said bottom, and means associated with the forward end of the mat for preventing such flexing at the said forward end.

2. A drag mat comprising a plurality of sections extending transversely of the mat and consecutively hinged to one another, each section having resilient stiffening means normally holding its bottom in a single plane while permitting a limited flexing of the said bottom, and an inflexible bar connected to the forward section of the mat for preventing such a flexing of that section.

3. A drag mat comprising a plurality of sections extending transversely of the mat and consecutively hinged to one another, each section having resilient stiffening means normally holding its bottom in a single plane while permitting a limited flexing of the said bottom, and an inflexible bar connected to the stiffening means on the forwardmost section for cooperating with the stiffening means of the said section in preventing a flexing of that section transversely of the face of the mat.

4. A drag mat comprising a plurality of sections extending transversely of the mat and consecutively hinged to one another, each section having resilient stiffening means normally holding its bottom in a single plane while permitting a limited flexing of the said bottom, and a bar disposed adjacent to the forwardmost section of the mat and hingedly connected to the stiffening means on the forward section of the mat, the said bar being inflexible transversely of the face of the mat and the said connection being so arranged that the inflexibility of the bar prevents a flexing of the stiffening means on the said forwardmost section.

5. A drag mat comprising a plurality of sections extending transversely of the mat; each section comprising a repeatedly recurved metal strip presenting its lower edge in a single plane and having a plurality of alined perforations, and a pair of stiffening rods extending through the said perforations transversely of the mat, each stiffening rod being resilient and normally straight, and affording a hinge connection between two adjacent strips, the adjacent strips having their bends disposed for affording pocket formations between them, and auxiliary means connected to the forward section for preventing a flexing of the stiffening rod forming part of that section.

6. A drag mat as per claim 5, in which the stiffening rods are spaced from the lower edge of the strips so as to confine the dragging action of the section substantially to the lower edge portions of the said strips.

7. A drag mat as per claim 5, in combination with means for pulling the mat, the said pulling means being connected to the said auxiliary means.

Signed at Chicago, Illinois, March 21, 1924.

EDWARD G. ROBERTS.